R. J. GRANT.
METHOD OF WRITING MUSIC.
APPLICATION FILED AUG. 20, 1909.
1,085,603.
Patented Feb. 3, 1914.
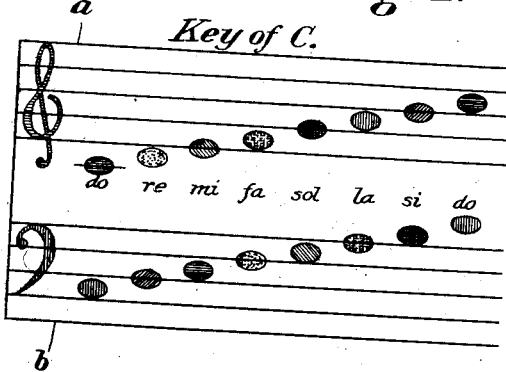
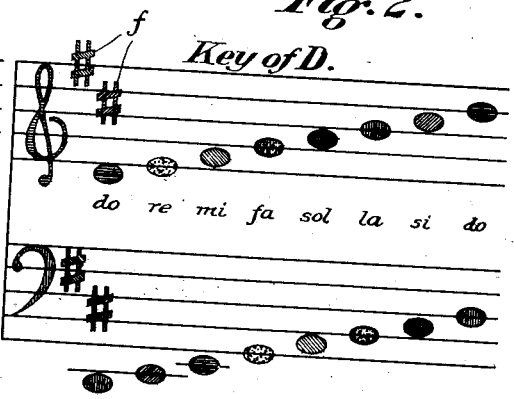
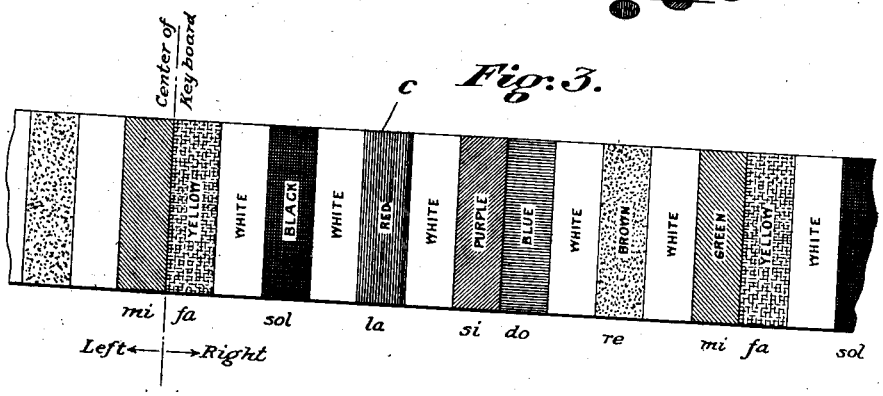
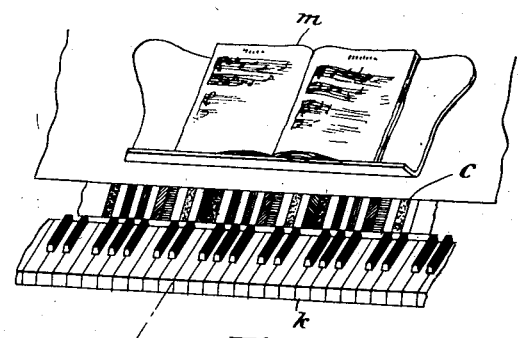
Witness:
Chas. S. Lepley
Fred. Stanb
Inventor;
Robert J. Grant
By J. W. H. Clay
his atty.

June # UNITED STATES PATENT OFFICE.

ROBERT J. GRANT, OF PITTSBURGH, PENNSYLVANIA.

METHOD OF WRITING MUSIC.

1,085,603.

Specification of Letters Patent. Patented Feb. 3, 1914.

Application filed August 20, 1909. Serial No. 513,801.

*To all whom it may concern:*

Be it known that I, ROBERT J. GRANT, a citizen of the United States, residing at Pittsburgh, in the State of Pennsylvania, have invented a certain new and useful Method of Writing Music, of which the following is a specification.

My invention relates in general to the graphic representation of music, and is particularly designed to render the reading of music more easy and accurate, and to aid beginners in becoming familiar with the vocal scale, etc.

Primarily the object of my invention is to provide written music in colors wherein each tone of the vocal scale has always a distinctive color, so that the notes have distinctive characteristics and the reader is not required to depend upon the relative position of the staff and the printed notes in order to locate the relative position in the vocal scale, of any particular tone.

Incidentally, my object is to graphically represent by colors the sharps and flats involved in changing the key, and in general to facilitate the reading of music and the recognition of the key by a color scheme as hereinafter described.

In the accompanying drawing forming part of this specification, Figure 1 represents parts of the ordinary two clefs with the scale written thereon in the key of C, according to my color scheme. Fig. 2 is a similar illustration for the key of D. Fig. 3, represents a chart to be placed on or near a key-board and used in connection with reading the music, in order to indicate in colors the key corresponding to the colored notes,—as I illustrate by the partial perspective view of Fig. 5, in which the scale is applied to a piano or organ. Fig. 4 is a view similar to that of Fig. 1 showing the key of B flat and Fig. 6 shows a modified plan for indicating the key.

In music as at present written, each note is represented by a certain sign which is exactly the same as the sign for any other note, its meaning being recognized only by its position on the clef. Consequently, there is nothing in the written music to give to any note itself a distinctive characteristic appealing to the eye, or which can be carried in the memory. Moreover, in vocal music, the separate tones of a scale are not even represented uniformly by anything whatever, for though in any particular key the note do for example has one position relative to the clef throughout, in that key, yet as soon as the key is changed, the note do has a different position on the clef. In other words, a singer in order to identify the tone corresponding to a given note in written music, must simultaneously be aware of the position of the note on the clef, and of the number and position of the sharps or flats of the key in which he is singing. My invention overcomes this difficulty by providing a distinctive color for each one of the seven tones in a vocal scale, which color under all conditions and invariably represents that tone and no other, regardless of the key in which the music is written, or change of keys. The singer therefore, has but to learn to identify seven simple colors with the corresponding seven tones of the scale, and thereafter the reading of music requires nothing more than to observe the color and its location with respect to the other neighboring colors. It is well known in psychology that the mind recognizes and remembers colors more easily than shapes or positions, and it will be evident therefore that my invention provides a simple written music which may readily be carried in the memory, and renders both the reading and the instrumental playing more easy.

In the accompanying drawings it will be seen from Fig. 1 that in the natural or key of C, the seven tones of the scale are written in the treble clef, $a$, beginning with a blue note for the do and proceeding with brown, green, yellow, black, red, and purple in order; while in the bass clef, whose distinctive color is red, the scale begins with the do in red, and proceeds with the colors purple, blue, brown, green, yellow, and black, in the same order as in the treble clef. Throughout the piece of music, in this key or any other key, the fundamental or key note do is thus identified with the color blue in the treble clef and the color red in the bass clef. In order to make this clearly appeal to the eye, I generally prefer to write the sign of the treble clef, $d$, in blue and the sign of the bass clef, $e$, in red, showing always the key note color. But I may change the color of the clef sign to correspond with the color which the key note has in the natural or key of C, so that a clef sign in brown, for example, (Fig. 6) will show that the key is D, since the D is brown in the natural key and the flat signs show that it is D flat without the necessity of counting or locating these flat signs.

In Fig. 2, which represents a scale in the key of D, it will be observed that the same color scheme follows as before, and the sharp signs, f, are respectively green and purple to show that the corresponding notes mi and si are sharp, while the music in the treble clef still has the key note blue in the key of D as in any other key, and similarly in the bass clef, the do is red. The position of the red or blue note itself shows the key, in addition to which the color of the sharp or flat sign shows which tones in the scale are to be flatted or sharped. Fig. 4 illustrates the scale in the key of B flat, from which it will be observed that the same scheme still prevails, the flat signs, g, being in the colors brown and blue. If the clef signs have the colors of the original note tones as above described, the key may be more readily borne in mind.

In order to facilitate the playing of the music on instruments, I also provide for each key, a special color chart, c, which being placed over or near the key-board, k, will indicate the key to be struck by the same color as that appearing in the note to be played. For example, whenever the player sees a blue note,—whatever key he may be playing in,—he knows that he is to strike the key indicated by the blue color on the chart. To allow for the half tones, white spaces are left between the colored sections of the chart, so that it becomes easier to locate the sharps and flats in playing. For each key the chart is arranged differently, so that the blue color always comes opposite the key note, it being understood of course, that there are fifteen charts arranged in a different manner. Fig. 5 illustrates the use of such a chart on a piano key-board in connection with music written according to my invention. It is to be understood that the same or similar charts can be used with any musical instrument by placing them in any convenient position near the key-board. When the chart is used in connection with the written music the key note of both the bass and treble clef is blue instead of having the key note of the bass red, as this permits a uniform arrangement of colors on the chart for the piano.

From the above description it will be apparent that the use of my invention involves no change whatever in the present style of writing music, except the use of a distinctive color to represent each one of the tones of the scale; and that by use of the invention a singer is enabled to produce the proper tones in their proper order by the simple device of associating in his mind one particular color with each one of the seven tones of the scale, beginning with the key note always blue. He therefore reads the colors instead of being required to observe the position on the clef of the written note and at the same time attend to the sharp and flat signs. Having once begun with the correct note he follows by the sole guidance of the colors. It will be clear that children and beginners will thus find the singing of music greatly simplified; while with the chart C the matter of playing instrumental music becomes the simple action of striking that note on the instrument which is indicated on the chart by the same color as that of the written note.

Other advantages of the invention will readily occur to those familiar with this art.

I claim as my invention the following:

The combination with pieces of music written in different keys, each piece having the notes of each octave provided with distinctive colors arranged in a pre-determined order from the basic note of the key, and the color of the basic notes of the several pieces being the same, and a plurality of charts for detachably engaging the keyboard of an instrument, one for each key, each chart having colored sections thereon adapted to aline with the keys of the instrument and the colors on each chart being arranged in the same order as the colors for the notes of the corresponding piece and alining with the key of the instrument that produces the tone of the correspondingly colored note of the piece in the same octave.

In testimony whereof, I have hereunto signed my name this 19 day of August, 1909, in the presence of the two subscribed witnesses.

ROBERT J. GRANT.

Witnesses:
FRED. STAUB,
CHAS. S. LEPLEY.